United States Patent [19]
Füller et al.

[11] Patent Number: 5,356,279
[45] Date of Patent: Oct. 18, 1994

[54] MACHINE FRAME WITH A MOVABLE SCAFFOLD FOR THE TOOL AREA OF AN INJECTION MOLDING MACHINE

[75] Inventors: Klaus Füller; Walter Stein, both of Schwerin, Fed. Rep. of Germany

[73] Assignee: Hemscheidt Maschinentechnik Schwerin GmbH & Co., D-Schwerin, Fed. Rep. of Germany

[21] Appl. No.: 984,790

[22] Filed: Dec. 3, 1992

[30] Foreign Application Priority Data

Dec. 3, 1991 [DE] Fed. Rep. of Germany ....... 4139758

[51] Int. Cl.⁵ ............................................. B29C 45/17
[52] U.S. Cl. .................... 425/186; 425/190; 425/542; 425/589
[58] Field of Search ............... 425/151, 542, 186, 190, 425/192 R, 450.1, 451.9, 589, 595

[56] References Cited

U.S. PATENT DOCUMENTS

| 4,530,655 | 7/1985 | Hehl | 425/589 |
|---|---|---|---|
| 4,696,637 | 9/1987 | Riviere et al. | 425/589 |
| 4,698,007 | 10/1987 | Hehl | 425/589 |
| 4,810,181 | 3/1989 | Ozawa | 425/589 |
| 4,984,980 | 1/1991 | Ueno | 425/595 |
| 5,238,394 | 8/1993 | Hirata | 425/595 |

FOREIGN PATENT DOCUMENTS

| 130118 | 3/1978 | Fed. Rep. of Germany . |
|---|---|---|
| 0154121 | 2/1982 | Fed. Rep. of Germany . |
| 4039325 | 7/1991 | Fed. Rep. of Germany . |

*Primary Examiner*—James Mackey
*Attorney, Agent, or Firm*—C. Hildebrand

[57] ABSTRACT

A machine frame with a displaceable scaffold for a tool space of an injection molding machine with stationary and movable tool clamping plates connected by columns that are adjusted to a tool height with a tool height adjusting device, the machine frame being formed with a stepped profile for lowering of the center of gravity of the movable tool clamping plate, the slide carriage of the movable tool clamping plate being displaceable on lower straps formed as guideways, and the displaceable scaffold being displaceable on the inner straps of the machine frame and the slide carriage, and being connected with the tool height adjusting device by connecting rods, the displaceable scaffold being shifted under the stationary tool clamping plate when the forming tool is closed.

4 Claims, 6 Drawing Sheets

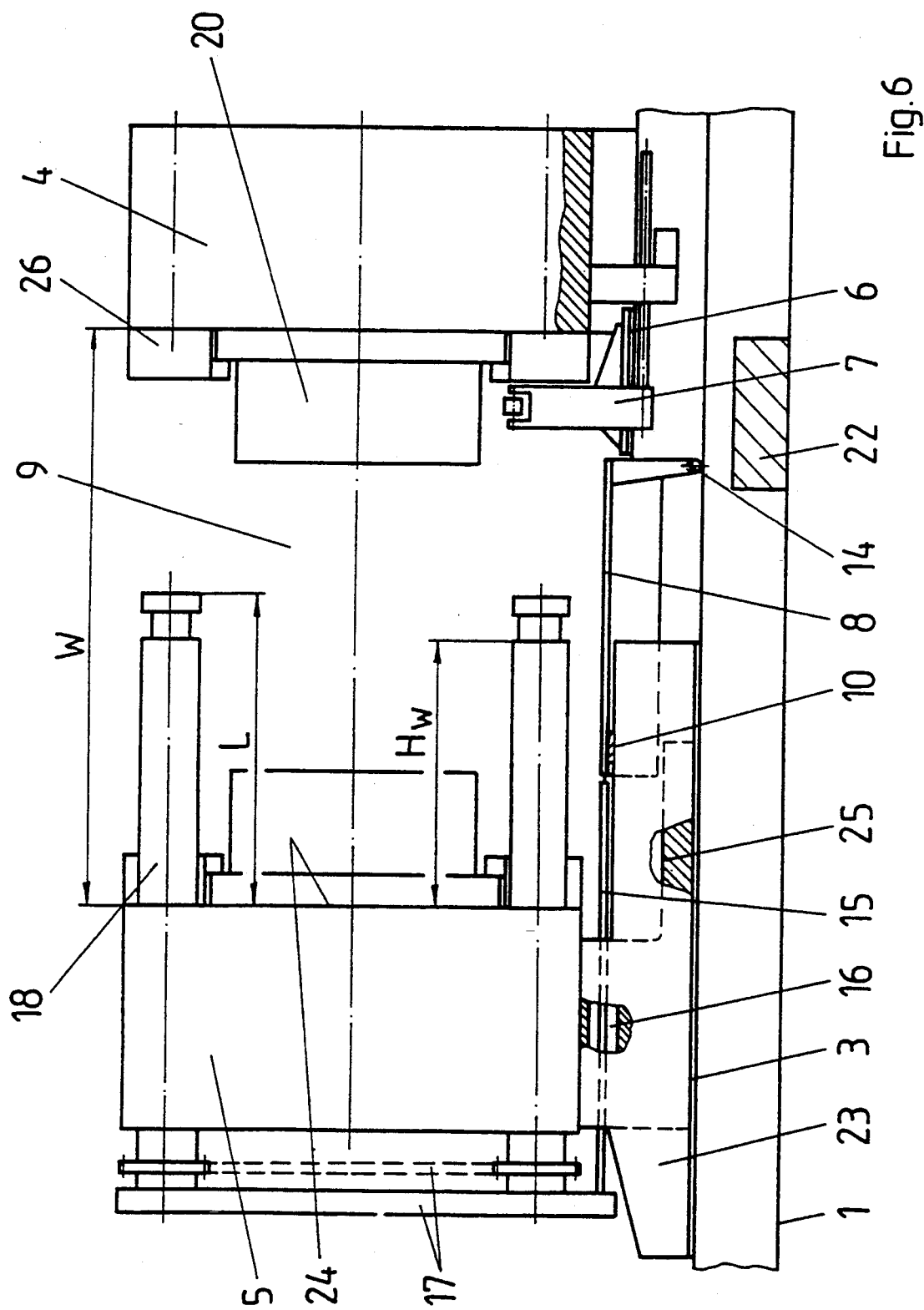

MACHINE FRAME WITH A MOVABLE SCAFFOLD FOR THE TOOL AREA OF AN INJECTION MOLDING MACHINE

BACKGROUND OF THE INVENTION

The invention relates to a machine frame with a movable scaffold for the tool area of an injection molding machine. The scaffold is arranged between a stationary tool clamping plate and a tool clamping plate that is displaceable on a slide carriage, for receiving two halves, respectively, of a forming tool. The movable tool clamping plate is displaceable on a guideway of the machine frame. The tool clamping plates are connected by columns extending into both tool clamping plates or, advantageously, supported in a cantilever fashion on the movable tool clamping plate. The columns are adjusted to an appropriate tool height by means of a tool height adjusting device.

For injection molding machines having large tool clamping plates, a large and stable machine frame for supporting the tool clamping plates is necessary. The machine frame is formed of longitudinal bars kept at a predetermined distance by cross-struts. On the upper surface of the machine frame, guideways for the slide carriage of the movable tool clamping plate are located. If required, a movable cross-strut with rollers for automatic tool exchange, according to DE-OS 4,039,325 is displaceable on the guideways. The drawback of this construction is that the rigidity required by the large machine frame, with the thereon displaceable tool clamping plate, necessitates a correspondingly high building structure for mounting the machine.

To lower the center of gravity, it is proposed in DDR patent 130,118, to form the tool clamping plates as isosceles triangles which are aligned with their apexes vertically downward between the guideways of the machine frame. However, the drawback of this solution is that the tool clamping surfaces are reduced and the force distribution and dimensioning are uneven, because mainly square and rectangular forming tools are used and the corresponding tool clamping plates are normalized accordingly. This also raises a further problem of shaping and forming the scaffold displaceable in the tool area of the injection molding machine which should be positioned very deeply downward. The movable scaffold that enters the tool area to enable maintenance, repair or for removal purposes, should simultaneously fulfill a safety function that provides for automatic switch-off of the machine in case a foreign element penetrates the tool area.

A corresponding solution is disclosed in DDR Patent 154,121. According to this solution, the scaffold occupies the total tool area and is supported on a connecting spring-biased mechanism and actuates an electrical switching mechanism after corresponding displacement. This solution is very costly and requires a vertical displacement space which is not available with integration of an automatic tool exchange system.

SUMMARY OF THE INVENTION

Accordingly, it is an object of the present invention to lower the tool area of an injection molding machine provided with automatic tool exchange means in a manner that would not require complex and costly modifications of the machine frame and the movable scaffold. Another object of the invention is to lower, without modifying the tool clamping surface, the center of gravity of the movable tool clamping plate with respect to the machine frame of the injection molding machine and to reduce costs of the necessary modification of the scaffold movable in the tool area of the injection molding machine.

Pursuant to these objects, and others which will become apparent hereafter, one aspect of the present invention resides in a stepped machine frame with two upper outer straps and two inner deeply located straps, with the inner straps being formed as guideways on which the slide carriage of the movable tool clamping plate is displaceable. The displaceable scaffold is displaceable on the inner straps of the machine frame and on the slide carriage and is connected with the tool height adjusting device by connecting rods. When the forming tool is closed, the displaceable scaffold is shifted under the stationary tool clamping space.

In another embodiment of the invention, a device for automatic tool exchange is arranged transverse to the machine axis. In this embodiment, a forming tool arranged on the stationary tool clamping plate is displaceable and braceable in guides and opposite the movable tool clamping plate on a cross-strut with rollers, which cross-strut is displaceable between the tool clamping plates. According to the invention, the upper straps are formed only as guideways on which the cross-strut is displaceable. The scaffold has a stepped shape corresponding to the lower profile of the displaceable cross-strut.

In a further embodiment of the invention, the displaceable scaffold is displaced on support rollers rolling on the guideways formed by lower straps and in slides arranged beneath the scaffold.

The advantage of the present invention is that, due to the stepped form of the machine frame and displacement of the slide carriage on the lowered guideways, the center of gravity is substantially lowered, without reducing the tool clamping surface. Correspondingly, with the stationary tool clamping plate and an injection unit aligned toward it, the center of gravity can be lowered, and this is effected in a very economic manner.

Another advantage of the invention is that, with changing the tool height, the position or location of the displaceable scaffold is automatically adapted to the changed dimension of the tool area. This permits use of a relatively small scaffold. The stepped surfaces of the displaceable scaffold are equipped with conventional electronic switch-off elements which perform an import safety function that protects the tool area. Altogether, the inventive features permit technical improvement of the injection molding machine and achieve a corresponding economical advantage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a front view of an open tool area of the injection molding machine shown in FIG. 5.

DETAILED DESCRIPTION OF THE PREFERRED EMBODIMENTS

Figure 1:
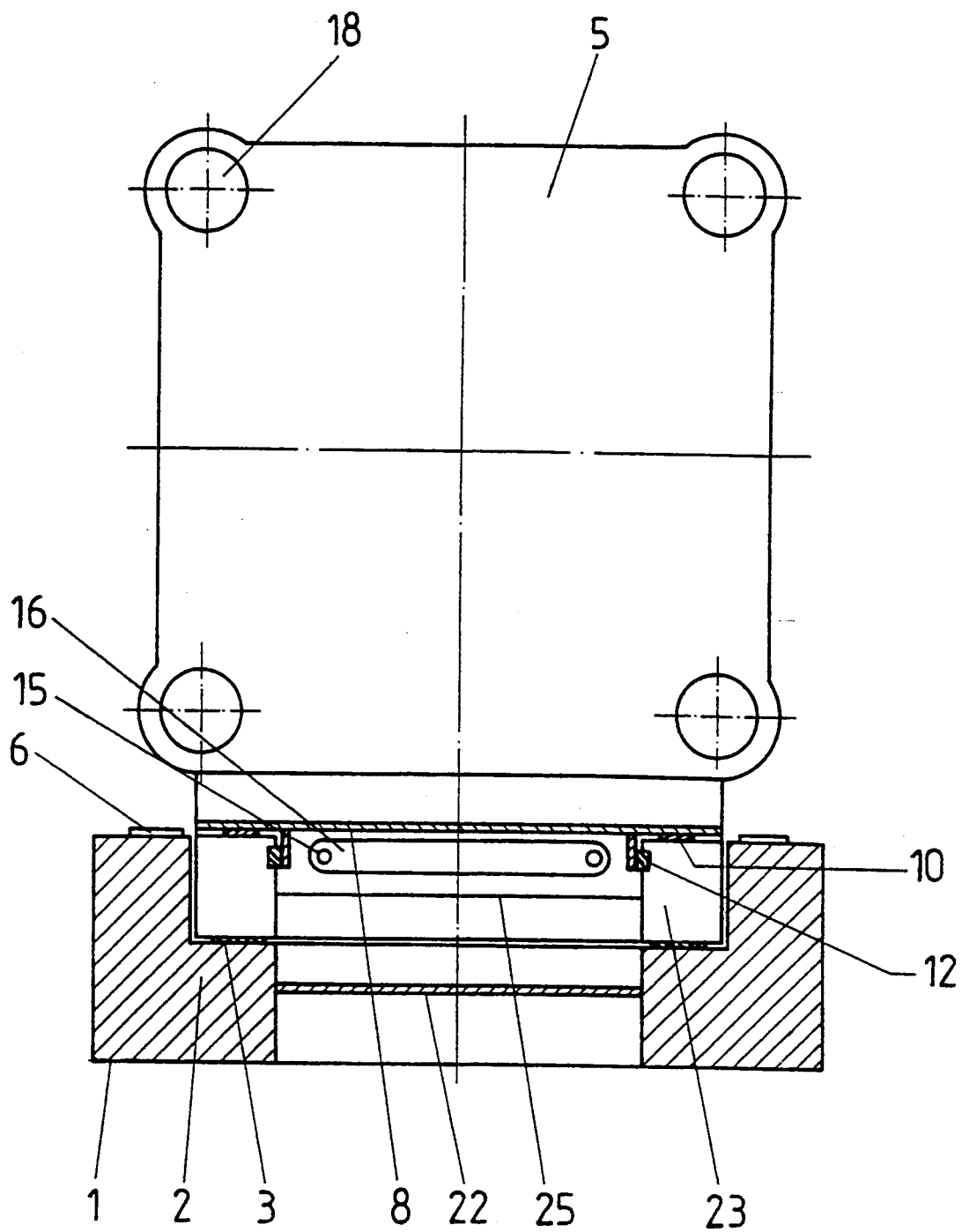
FIG. 1 shows a cross-sectional view of an injection molding machine with a movable tool clamping plate displaceable on a stepped machine frame and a displaceable scaffold arranged in a tool area.
Figure 2:
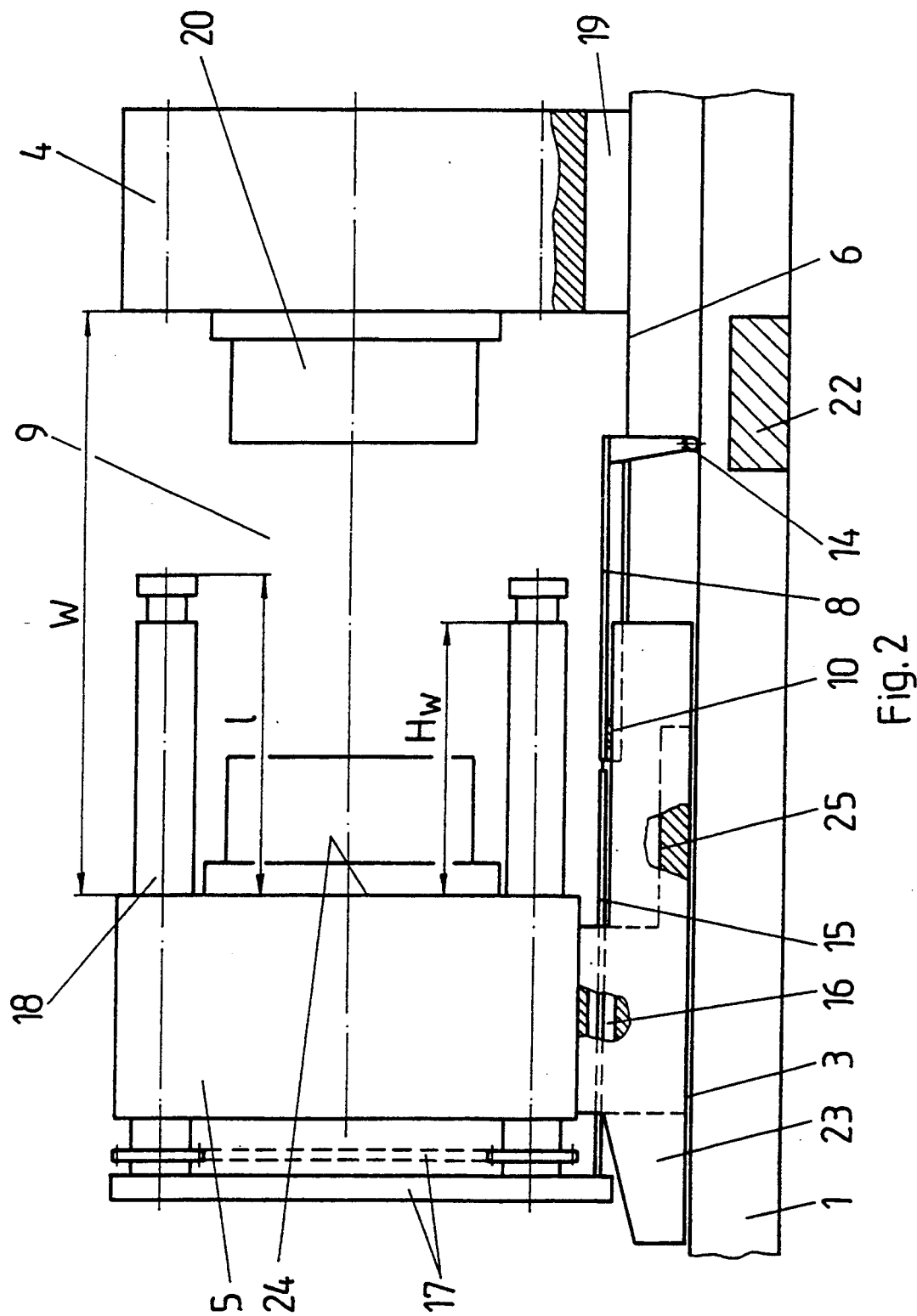
FIG. 2 is a front view of an open tool area of the injection molding machine shown in FIG. 1.

FIG. 1 shows a partial cross-sectional view of an injection molding machine having a movable tool clamping plate 5 associated with cantilever support columns 18 and a stepped machine frame 1. The columns 18 connect the movable tool clamping plate 5 with a stationary tool clamping plate 4. The two clamping plates 5 and 4 support two halves of a forming tool 20, respectively, as shown in FIG. 2. The columns 18 are adjusted to a respective height $H_w$ by a height adjusting device 17, and the machine frame 1 is formed of two longitudinal bars 2 arranged parallel to each other. The bars 2 have a stepped form and are each provided with countersunk inner straps 3 and outer straps 6. The bars 2 are connected with each other by cross-struts (not shown in the drawings). The inner straps 3 are formed as guideways on which a sliding carriage 23 of the movable tool clamping plate 5 is displaceable. With this stepped machine frame, the center of gravity of the movable clamping plate 5, with an injection unit (not shown) mounted thereon, is lowered. This results, along with reduction of the constructional height of the injection molding machine, in corresponding cost savings and a better stability during the injection molding process.

An accessible scaffold 8 is displaceably arranged on the inner straps 3 of the machine frame 1 and the carriage 23. To this end, the scaffold is provided, at an end thereof adjacent the stationary tool clamping plate 4, with support rollers 14 that roll on the inner straps 3. The opposite end of the scaffold 8 is displaceable, as can be seen in FIGS. 1 and 2, by means of a horizontal slide 10 and a vertical slide 12 on the slide carriage 23. In addition to the scaffold 8, for defining the tool area, an additional stepped surface 22, which is defined by a cross-element arranged between the bars 2 in front of the stationary tool clamping plate 4, and an additional stepped surface 25, which is defined by a cross element available in the sliding carriage 23, can be used.

The scaffold 8 is connected with the tool height adjusting device 17 by connecting rods 15. This has the advantage that, with each forming tool change that requires an adjustment of the tool height $H_w$, a corresponding shift of the displaceable scaffold 8 and its adaptation to the open space 9 takes place. With that, the connecting rods 15 extend through opening 16 in the carriage 3.

In FIG. 2, the movable tool clamping plate 5 is moved far backward, and the dimension W defines the width of the tool area 9. FIG. 2 clearly shows that the scaffold 8 is located between the two halves of the forming tool 20 at the same distance from each half. The halves of the forming tool 20 are secured on clamping surfaces 24 of the clamping plates 4, 5. The additional stepped surfaces 22 and 25 are arranged beneath the scaffold 8 to the right and to the left, respectively. FIG. 2 shows only one stepped surface. The additional stepped surfaces 22 and 25, as well as the displaceable scaffold 8, are provided with electronic switch elements (not shown) which prevent inadvertent closing of the forming tool 20 if forming bodies are in the tool area 9.

The dimension 1 indicates the length of the columns 18 from the clamping surface 24 of the movable tool clamping plate 25.

Figure 3:
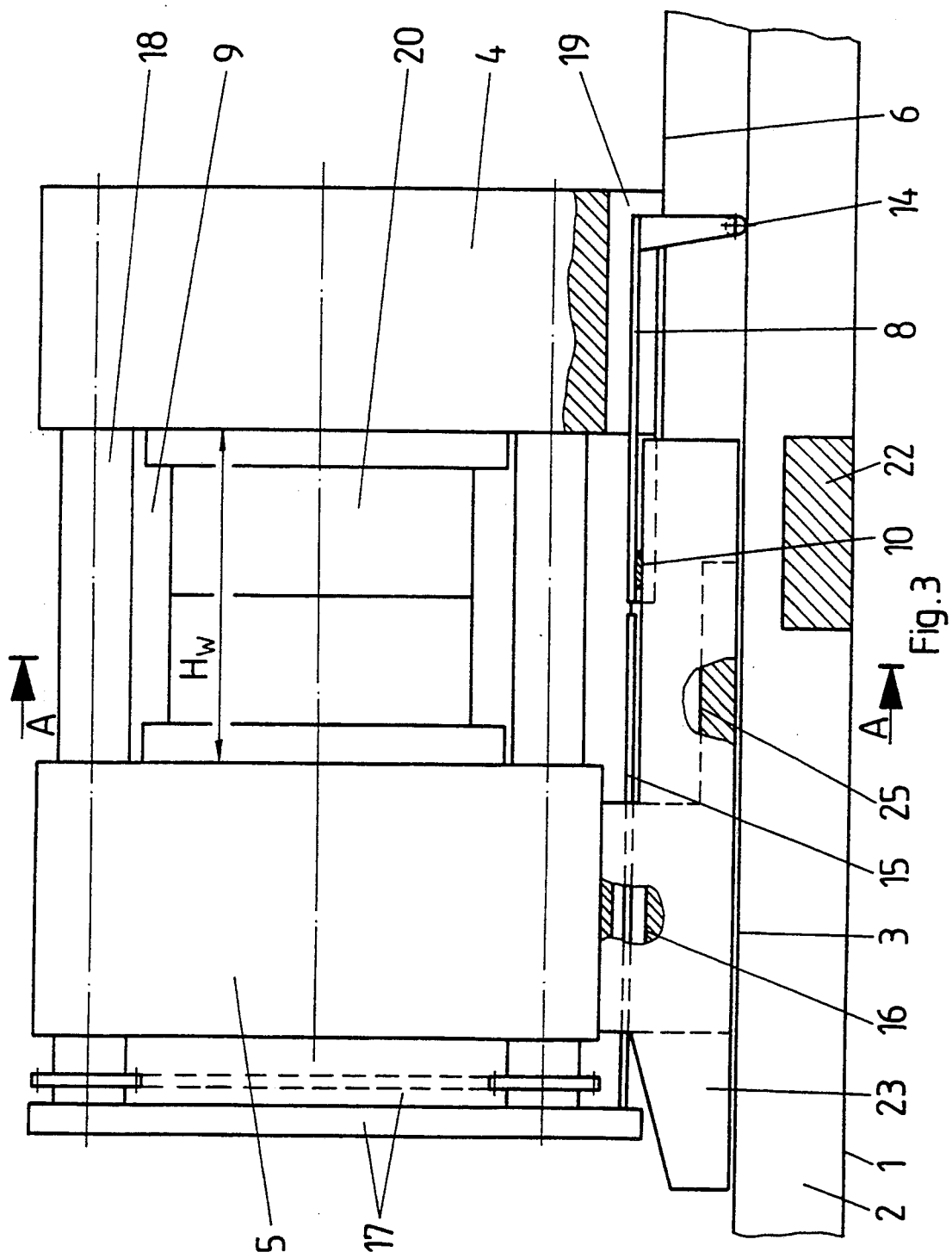
FIG. 3 is a view similar to FIG. 2, with a closed tool area of the injection molding machine with the scaffold under the stationary tool clamping plate.

FIG. 3 shows a position in which the halves of the forming tool 20 are closed, and the columns 18 extend into the tool clamping plate 4, and are locked therewith. As can be seen in FIG. 3, in this position, the scaffold 8 is partially located beneath the stationary clamping plate 4. Shifting the scaffold 8 under the stationary tool clamping plate is possible due to opening 19 provided for the slide carriage 23. In this closed position, the scaffold 8 overlaps partially or completely, depending on the tool height $H_w$ of the stepped surface 25 between the slide carriage 23 and the stepped surface 22 between the bars 2.

Figure 4:
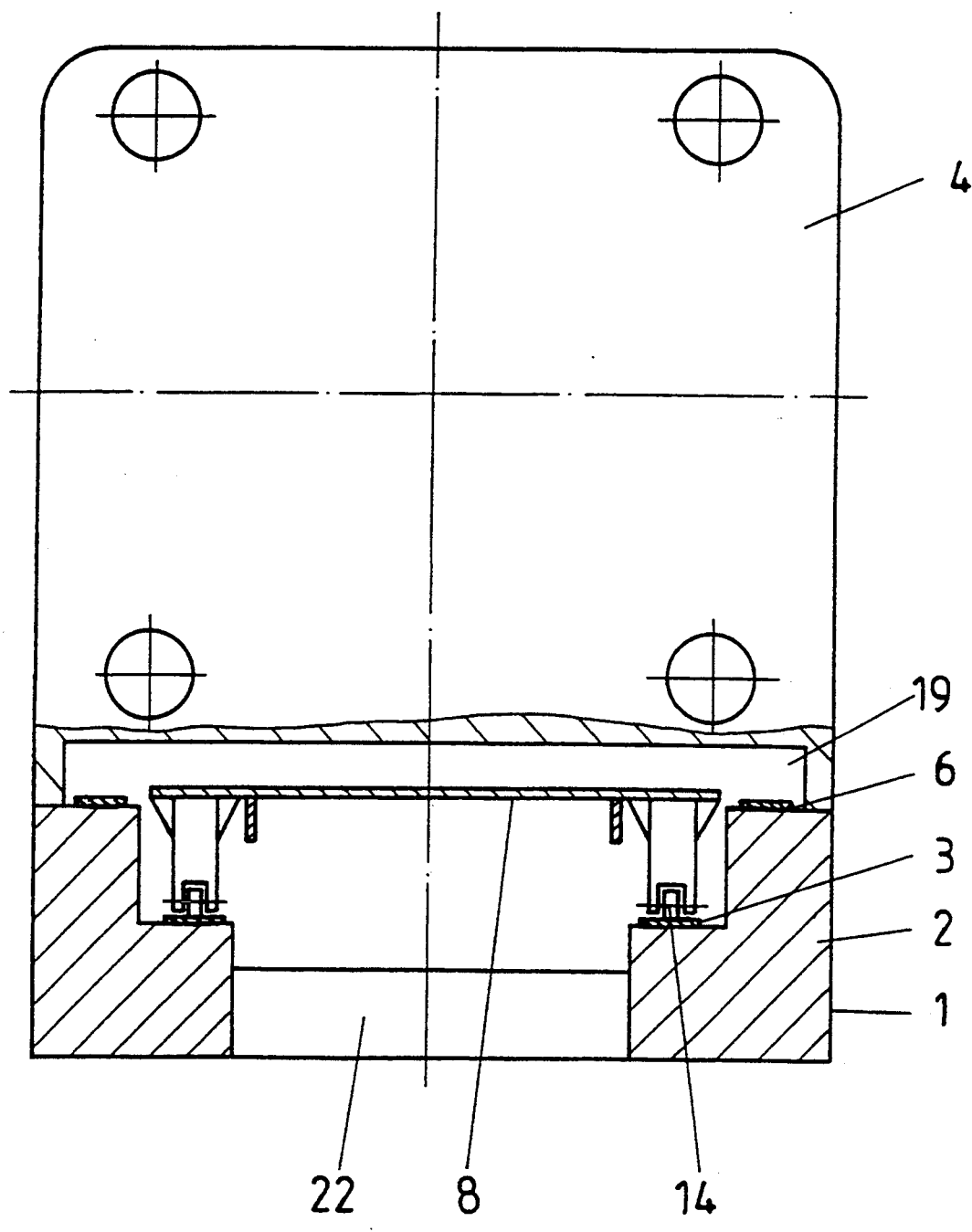
FIG. 4 is a cross-sectional view along lines A—A in FIG. 3 with the stationary tool clamping plate without the forming tool.

FIG. 4 shows a partial cross-sectional view along line A—A in FIG. 3, in which the stationary clamping plate 4, without the forming tool 20, can be seen. The opening 19 in the stationary tool clamping plate 4 is wider than the scaffold 8, so the latter can be displaced under the stationary tool clamping plate 4 in an unhindered manner.

Figure 5:
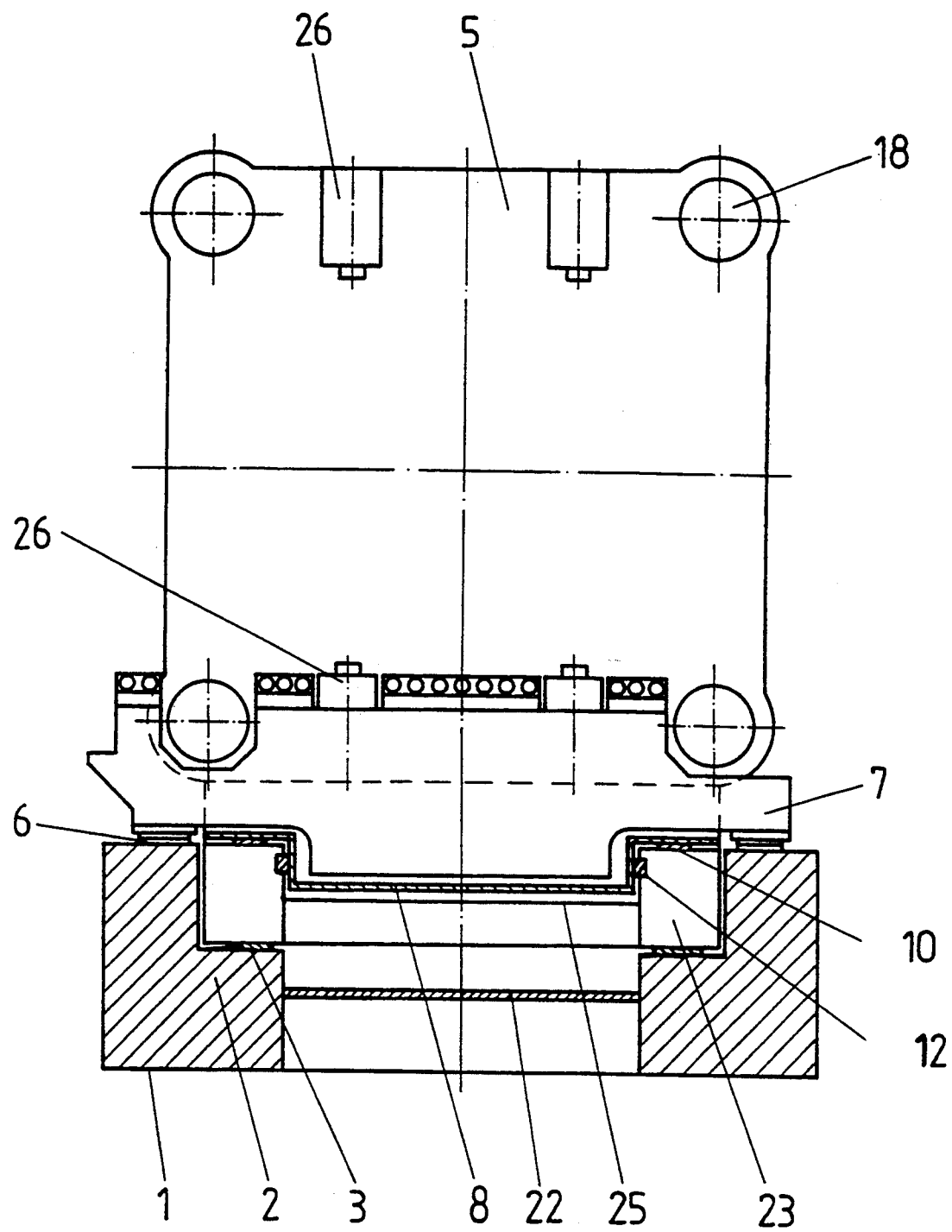
FIG. 5 is a partial cross-sectional view showing a movable tool clamping plate, displaceable scaffold, and a device for automatic tool exchange.

FIG. 5 shows a cross-sectional view of the machine frame 1 showing the movable tool clamping plate 5 and the displaceable cross-strut 7, which is arranged in front of the tool clamping plate 5 and is provided with rollers for automatic tool exchange transverse to the machine axis. To this end, a forming tool (not shown) in FIG. 5 located on the stationary tool clamping plate 4 is displaced in guides towards the movable tool clamping plate 5 on the cross-strut 7. The forming tool is secured, with clamping cylinders 26 on the respective tool clamping plate. The cross-strut 7 for automatic tool exchange is an obstacle for the displaceable scaffold 8. Because of this, as shown in FIGS. 5 and 6, the scaffold 8 is formed, in the region of the displaceable cross-strut 7, with steps so that the scaffold 8 can be displaced beneath the cross-strut 7 unhindered. The cross-strut 7 is, as can again be seen in FIGS. 5 and 6, displaceable on the upper straps 6, which, for this purpose, are shaped as guideways. As has already been discussed above, the slide carriage 23 of the movable tool clamping plate 5 and the scaffold 8 are displaceable on the lower straps 3.

Now the operation of the arrangement will be shortly explained. Depending on the forming tool 20 to be used and its tool height $H_w$, the columns 18 are adjusted to the dimension 1 with the tool height adjusting device 17. Simultaneously, a corresponding displacement of the scaffold 8, relative to the movable tool clamping plate 5, is effected by means of the connecting rods 15. The scaffold 8 is displaced toward or away from the movable tool clamping plate 5 as required. When closing of the forming tool 20 takes place, the scaffold 8 is automatically partially displaced under the stationary tool clamping plate 4 through the opening 19. Thereby, the scaffold 8 overlays the stepped surfaces 22 and 25 in an unhindered manner. The stepped surface 25 on the sliding carriage 23, the stationary surface 22 between the longitudinal bars 2, and the displaceable scaffold 8 limit the whole tool area 9 and protect by means of electronic safety elements the operational safety of the tool working space.

While the invention has been illustrated and described as embodied in a machine frame with a movable scaffold for the tool area of an injection molding machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A machine frame for an injection molding machine, comprising:

a displaceable scaffold for a tool area of the injection molding machine;

a stationary tool clamping plate;

a tool clamping plate displaceable on a slide carriage and opposite said stationary clamping plate, the scaffold being arranged between said clamping plates, each of the clamping plates supporting half of a forming tool;

a plurality of columns provided so as to extend into said tool clamping plates when said plates are moved toward one another;

tool height adjusting means for adjusting the length said columns extend between said tool clamping plates to correspond to a tool height;

the machine frame having a stepped height;

two upper outer straps arranged on a top step of the stepped frame;

two inner straps arranged on an inner, lower step of the frame, said inner straps forming guideways on which the slide carriage of said displaceable tool clamping plate is displaceable; and connecting rods provided so as to connect said displaceable scaffold with said tool height adjusting means, said scaffold being displaceable on the guideways formed by the inner straps and on the carriage so that upon closing of the forming tool said scaffold is shifted under said stationary tool clamping plate.

2. A machine frame as defined in claim 1, wherein said columns are supported in a cantilever manner on said displaceable tool clamping plate.

3. A machine frame as defined in claim 1, and further comprising means for automatically exchanging the forming tool transverse to the molding machine axis so that the forming tool is displaceable on a cross-strut, the cross-strut being arranged between said tool clamping plates, said upper straps forming guideways on which the cross-strut is displaceable, said scaffold being stepped so as to conform to a lower profile of the cross-strut.

4. A machine frame as defined in claim 1, and further comprising support rollers, mounted via holders to the scaffold, so as to roll on the guideways formed by the inner straps, and horizontal slides and vertical slides, arranged on the slide carriage beneath said scaffold, said scaffold being displaceable by said support rollers, said horizontal slides and said vertical slides.

* * * * *